Patented Oct. 8, 1935

2,016,480

UNITED STATES PATENT OFFICE 2,016,480

PERHYDROCARBAZYL COMPOUNDS OF THE PYRIDINE AND QUINOLINE SERIES

Max Bockmühl, Walter Krohs, and Gustav Ehrhart, Frankfort-on-the-Main, Germany, assignors to Winthrop Chemical Company, Inc., New York, N. Y., a corporation of New York No Drawing. Original application March 31, 1932, Serial No. 602,400. Divided and this application July 14, 1933, Serial No. 680,502. In Germany April 4, 1931

6 Claims. (Cl. 260—42)

The present invention relates to organic compounds of the perhydrocarbazole and perhydroacridine series, more particularly to compounds of the following general formula:

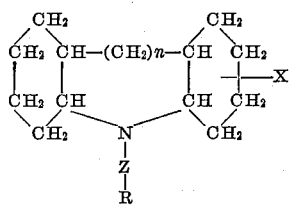

wherein $n$ means 0 or 1, Z stands for an alkyl or an alkoxy group which may be substituted by dialkylaminoalkyl, R stands for a radical of the pyridine and quinoline group which contains an amino- or imino group and may be substituted by alkyl or alkoxy and X may stand for alkyl or alkoxy substituting one of the hydrogen atoms of the —CH$_2$- groups.

We have found that compounds of the above constitution are obtained by converting perhydrocarbazole or perhydroacridine compounds by exchanging their imine-hydrogen according to general known methods for a basic group, into compounds containing several nitrogen atoms in which the introduced nitrogen atom or atoms is or are bound by means of an aliphatic, cyclic or alicyclic radical to the imino group of the perhydrogenated heterocyclic radical, or by converting according to known methods suitable intermediate products, derived from perhydrocarbazole or perhydroacridine by substitution of the imine hydrogen, into such compounds containing several nitrogen atoms.

These substances can be produced, for instance, by causing perhydrocarbazole or perhydroacridine to react with a halogen-alkyl-amine, which may be used in the form of the free base or in the form of a salt. The new compounds can also be prepared from perhydrocarbazole or perhydroacridine in other ways, for instance, by converting these perhydrogenated heterocyclic compounds by means of an alkylene oxide, halogen hydrin or alkylene dihalide into the corresponding N-hydroxyalkyl- or N-halogen-alkylperhydrocarbazole- (or acridine)-compound and causing the latter to react with a suitable basic compound containing a reactive group. As far as, for instance, N-amino - alkylperhydrocarbazole - (or acridine)-compounds are obtained, which still contain free hydrogen atoms in the amino groups, these compounds can further be caused to react with a compound containing a reactive group, for instance, containing halogen.

The N-hydroxyalkylperhydrocarbazoles, for instance, produced from perhydrocarbazole and halogen hydrins can be caused to react in the form of the alcoholates with a like result with compounds which contain a reactive halogen and either have a basic character or are capable of conversion into a compound of basic character by chemical transformation, for instance, by reduction.

From the foregoing, it will be understood that the member connecting the nitrogen or the perhydrogenated heterocyclic compounds with the introduced nitrogen may be of any nature. It may, for instance, be a simple aliphatic chain of carbon atoms, such as ethyl, propyl, which may be substituted, or a chain containing both carbon atoms and various other elements, such as oxygen, sulfur or nitrogen, for instance, ethoxy. The connecting member may likewise consist of a cyclic radical or it may be a combination of a cyclic radical with aliphatic groups. If the connecting member consists wholly or partly of a cyclic hydrocarbon radical, the perhydrocarbazole may also be caused to react with, for instance, an aromatic body containing nitrogen and a reactive halogen, such as, for instance, para-nitrochlorobenzene, and the reaction product obtained may be further converted into a polyamino-compound. The perhydrocarbazole can also be converted into a polyamino-compound by means of other suitable intermediate products according to the methods above described or any other usual methods.

The new compounds are valuable therapeutic substances; they are in the form of the free bases compounds which are difficultly soluble or insoluble in water, and form hydrochlorides which are soluble in water.

The following examples illustrate the invention:

(1) *1-perhydrocarbazylethylpyridine-2-amine*

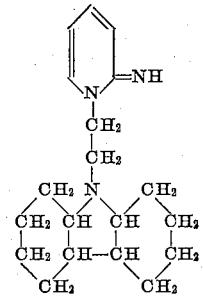

Perhydrocarbazole is heated for 8 hours at 150° C. with an excess of ethylene-chlorhydrin. The hydroxyethylperhydrocarbazole thus produced is purified by distillation in a vacuum. It boils at 126° C.–130° C. at 1 mm. pressure and is a colorless thick oil.

100 parts of hydroxyethylperhydrocarbazole in 400 parts of chloroform are slowly mixed with 60 parts of thionyl chloride, the chloroform and the excess of thionyl chloride are removed by distillation and the residue is dissolved in ethyl acetate. The hydrochloride of N-chlorethyl-perhydrocarbazole crystallizes out. The free base is obtained from the aqueous solution of the hydrochloride by addition of caustic soda solution and extraction with ether.

10 parts of 2-aminopyridine and 24 parts of chlorethyl-perhydrocarbazole are heated for 1 hour on the steam bath. After cooling, the mass is mixed with acetone whereby the monohydrochloride of the perhydrocarbazylethylpyridine-2-imine separates. It is filtered by suction and transformed by means of alcoholic hydrochloric acid into the dihydro chloride which, when recrystallized from a mixture of alcohol and acetone, melts at 274° C.

(2) *1-perhydrocarbazylethyl-4-methylpyridine-2-imine*

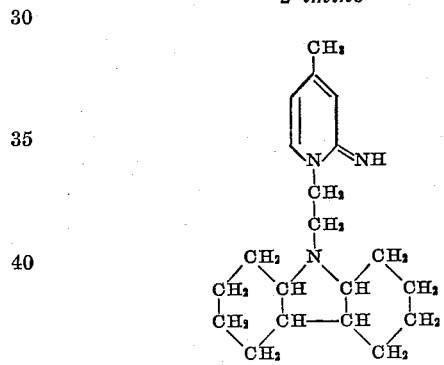

12 parts of chlorethylperhydrocarbazole and 6 parts of 4-methyl-2-aminopyridine are caused to react and the product is worked up as indicated in Example 1. A dihydro chloride is obtained, melting at 258° C.

(3) *1-perhydrocarbazylethylpyridine-4-imine*

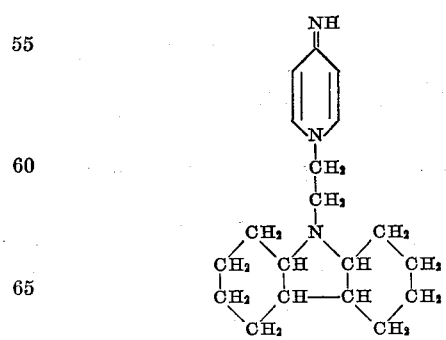

12 parts of chlorethylperhydrocarbazole, 5 parts of 4-aminopyridine and 5 parts of alcohol are heated for 15 minutes on the steam bath. On mixing with acetone the monohydrochloride of the new base separates; it forms with alcoholic hydrochloric acid a dihydrochloride, melting at 245° C.

(4) *1-perhydrocarbazylethylquinoline-2-imine*

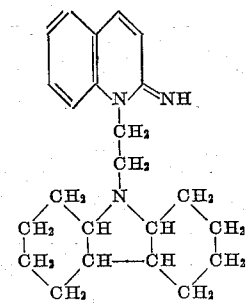

12 parts of chlorethylperhydrocarbazole, 7 parts of 2-amino-quinoline and 5 parts of alcohol are heated for 1 hour on the steam bath: the monohydrochloride of the new base is precipitated with acetone and transformed by means of alcoholic hydrochloric acid into the dihydrochloride of melting point 261° C.

(5) *1-perhydrocarbazylethyl-2-methyl-6-ethoxy-quinoline-4-imine*

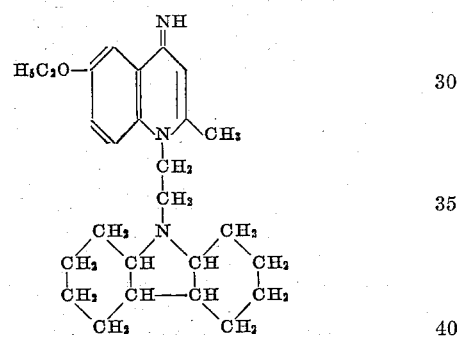

6 parts of chlorethylperhydrocarbazole, 5 parts of 6-ethoxy-4-aminoquinaldine and 5 parts of alcohol are heated for 1 hour on the steam bath. On mixing with acetone the monohydrochloride of the new compound separates. It is purified by recrystallization from alcohol and melts at 278° C.

(6) *Methylaminoethylperhydrocarbazole*

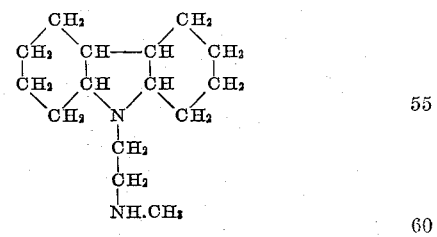

12 parts of chlorethylperhydrocarbazole are heated in a sealed tube for 2 hours at 100° C. with an alcoholic methyl-amine solution containing 6 grams of methylamine. The methylamine hydrochloride formed is filtered by suction, the alcohol is distilled from the filtrate and the residue is taken up with ethyl acetate. On mixing the ethyl acetate solution with alcoholic hydrochloric acid a monohydrochloride is formed which is transformed into a dihydrochloride by adding alcoholic hydrochloric acid until the reaction is feebly acid to Congo paper. The dihydro-chloride is purified by recrystallization from alcohol and acetone. It melts at 209° C.

(7) Diethylaminoethylperhydrocarbazole

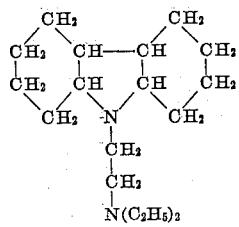

12 parts of chlorethylperhydrocarbazole, 8 parts of diethylamine and 25 parts of benzene are boiled for 2 hours in a reflux apparatus. The diethylamine hydrochloride formed is filtered by suction, the filtrate is shaken with dilute hydrochloric acid and the base is obtained from the hydrochloric acid solution by precipitation by means of potassium carbonate and extraction with ether. It boils at 135° C.–142° C. at a pressure of 3 mm. By treating a solution of the product in acetone with strong hydrobromic acid a dihydrobromide is obtained which, when recrystallized from acetone, melts at 191° C. The same substance is obtained by causing diethylaminoethylchloride or its hydrochloride to act upon perhydrocarbazole.

(8) Benzylaminoethylperhydrocarbazole

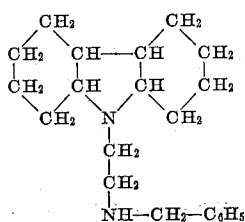

20 parts of chlorethylperhydrocarbazole and 20 parts of benzylamine are heated for 1 hour on the steam bath; the benzylaminohydrochloride produced is precipitated by means of benzene, filtered by suction and the filtrate worked up as indicated in Example 7. The base boils at 180° C.–190° C. at 4 mm. pressure and forms a dihydrobromide which crystallizes well and melts at 232° C. when recrystallized from alcohol.

(9) Methylbenzylaminoethylperhydrocarbazole

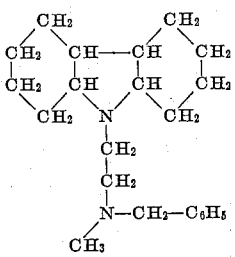

12 parts of chlorethylperhydrocarbazole and 12 parts of methylbenzylamine are heated for 1 hour on the steam bath. The methylbenzylamine hydrochloride is precipitated by means of ethyl acetate, filtered by suction and the filtrate solution is neutralized by means of alcoholic hydrochloric acid. The dihydrochloride of the methylbenzylaminoethylperhydrocarbazole separates; when recrystallized from alcohol, it melts at 240° C.

(10) 1-(N-perhydrocarbazyl)-2-(alpha-imino-N-pyridyl)-3-diethylaminopropane

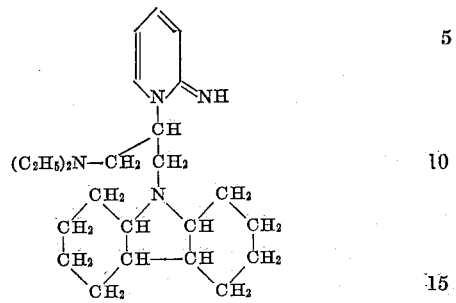

25 parts of 1-perhydrocarbazyl-2-hydroxy-3-diethylaminopropane are dissolved in 100 parts of chloroform and 15 parts of thionyl chloride are added drop by drop. The chloroform and excess of thionyl chloride are removed by distillation, the residue is mixed with water, filtered to remove undissolved flakes and the base is precipitated from the filtrate by addition of caustic potash solution and extracted with ether. After drying the ether extract and distilling the ether, the 1-perhydrocarbazyl-2-chloro-3-diethylaminopropane is obtained in the form of an oily product. 15 parts of this oil are heated for 1 hour on the steam bath with 5 parts of 2-aminopyridine. The reaction product is dissolved in alcohol and alcoholic hydrochloric acid is added until the reaction is strongly acid to Congo paper. The trihydrochloride of the 1-(N-perhydrocarbazyl)-2-(alpha-imino-N-pyridyl)-3-diethylamino-propane separates; after recrystallizing it from alcohol, it melts at 247° C.

(11a) 2-perhydrocarbazylethylaminopyridine

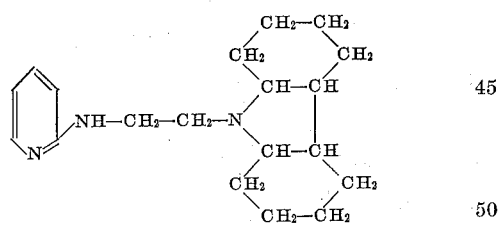

20 parts of 2-aminopyridine, 200 parts of toluene and 8 parts of sodamide are heated together, while stirring, for 2 hours on the steam bath. 36 parts of N-chlorethylperhydrocarbazole are then added and the whole is heated on the steam bath for a further hour. After cooling, the mass is mixed with water and hydrochloric acid, the toluene is separated and the base is precipitated from the hydrochloric acid solution by means of potassium carbonate. The base is extracted with ether and purified by distillation under reduced pressure. The 2-perhydrocarbazylethylaminopyridine boils at 200° C.–205° C. at 2 mm. pressure and forms a dihydrobromide melting at 209° C.

(b) The same compound is obtained by causing aminoethylperhydrocarbazole to react with 2-chloropyridine in the bomb tube. Aminoethylperhydrocarbazole boils at 145° C.–150° C. at 4 mm. pressure, and is obtainable by causing chlorethylperhydrocarbazole to react with dibenzylamine and splitting off the benzyl group by hydrogenation with palladium and hydrogen.

(12) *1-(2'-methylperhydrocarbazyl-ethylpyridine-2-imine*

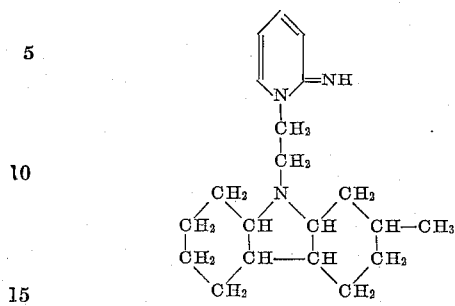

2-methylperhydrocarbazole (boiling at 124° C.–126° C. at 4 mm. pressure) is obtained by hydrogenating 7-methyl-1-2-3-4-tetrahydrocarbazole, which is formed from metatolylhydrazine and cyclohexanone according to the methods of Borsche. By causing 2-methylperhydrocarbazole to react with ethylene-chlorhydrin, the N-hydroxyethyl-2-methylperhydrocarbazole is obtained which boils at 152° C.–158° C. at 4 mm. pressure; when treated with thionyl chloride, it yields the N-chlorethyl-2-methylperhydrocarbazole.

7 parts of N-chlorethyl-2-methylperhydrocarbazole and 4 parts of 2-aminopyridine are heated for one hour on the steam bath. After cooling, the residue is rubbed with ether, the ether is poured off, the mass is mixed with acetone and the mono-hydrochloride of 1-(2'-methylperhydrocarbazylethylpyridine-2-imine is filtered by suction; when recrystallized from alcohol and ether, it melts at 217° C.

(13) *1-(3'-ethoxy)-perhydrocarbazyl-ethylpyridine-2-imine*

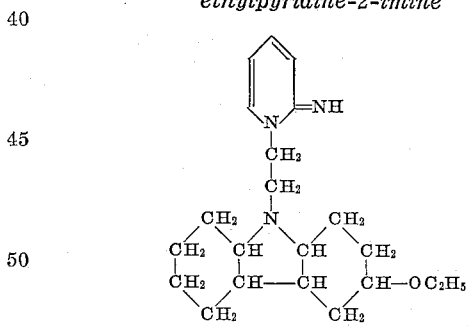

para-ethoxyphenylhydrazine (Berichte der deutschen chemischen Gesellschaft, volume 26, page 1663 and German Patent No. 68,159) is condensed with cyclohexanone and the tetrahydroethoxycarbazole is formed. 100 parts of the latter are hydrogenated at 220° C. and at a hydrogen pressure of 70–90 atmospheres with 200 parts of deca-hydronaphthalene and 10 parts of a nickel catalyzer so as to obtain the perhydro-3-ethoxycarbazole which, after the catalyzer has been filtered by suction and the decahydronaphthalene has been distilled, is purified by distillation under reduced pressure; it boils at 135° C.–140° C. at 5 mm. pressure. By causing perhydroethoxycarbazole to react at 150° C. with ethylene-chlorhydrin, the N-hydroxyethylperhydro-3-ethoxycarbazole is obtained which boils at 175° C.–180° C. at 4 mm. pressure; when treated with thionyl chloride in benzene, it yields the chlorethyl-perhydro-3-ethoxycarbazole.

3 parts of N-chlorethylperhydro-3-ethoxycarbazole and 2 parts of 2-aminopyridine are heated for ½ hour on the steam bath. After cooling, the residue is mixed with ether, the ether is poured off from the substance separated and the latter is dissolved in acetone. After the mass has been mixed with alcoholic hydrochloric acid the dihydrochloride of 1(3'-ethoxy)-perhydrocarbazylethylpyridine-2-imine separates which, when recrystallized from alcohol and acetone, melts at 236° C. with decomposition.

(14) *1 - perhydroacridylethyl-pyridine- 2 -imine*

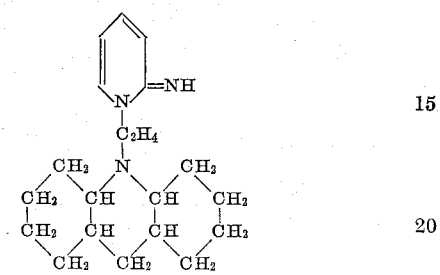

By causing perhydroacridine to react with ethylene-chlorhydrin, the hydroxyethylperhydroacridine is obtained which melts at 105° C.; when treated with thionyl chloride, it yields the chlorethylperhydroacridine.

13 parts of chlorethylperhydroacridine and 5 parts of 2-aminoparidine are heated for ½ hour on the steam bath. The mass is mixed with acetone, cooled and the monohydrochloride of the new base is filtered by suction. When treated with alcoholic hydrochloric acid, it yields a dihydrochloride which melts at 202° C.

(15) *1-perhydroacridylethyl-2-methyl-6-ethoxyquinoline-4-imine*

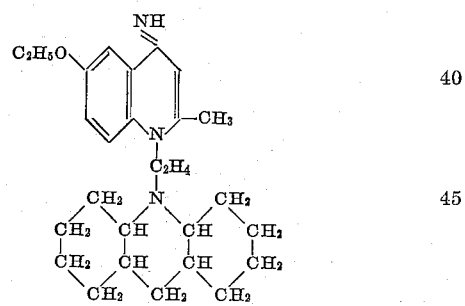

10 parts of 6-ethoxy-4-aminoquinaldine, 15 parts of chlorethylperhydroacridine and 10 parts of alcohol are heated for one hour on the steam bath. The mass is then mixed with acetone and the monohydrochloride of the new compound crystallizes out; by causing to react with alcoholic hydrochloric acid, it yields the dihydrochloride which, when crystallized from alcohol of 80% strength, melts at 237° C.

(16) *Para-diethylaminoethoxy-N-perhydro-acridylethyl-aniline*

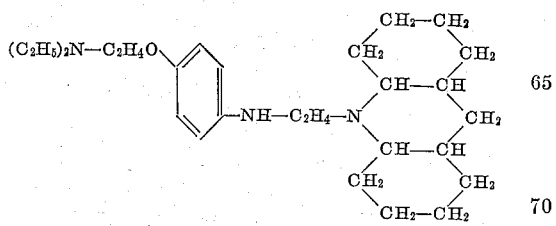

14 parts of para-diethylaminoethoxyaniline and 8.5 parts of chlorethylperhydroacridine are heated for one hour on the steam bath. After cooling, the mass is mixed with dilute caustic soda solution and the base is extracted with ether. The ether residue is distilled at 3 mm. pressure up to the boiling temperature at 200° C. The residue remaining in the distillation flask contains the condensation product desired. It is dissolved in acetone; when treated with alcoholic hydrochloric acid it yields a dihydrochloride which, when recrystallized from alcohol and acetone, melts at 203° C.

(17) *N-methyl-perhydroacridylethyl-ac-tetrahydro-beta-naphthylamine*

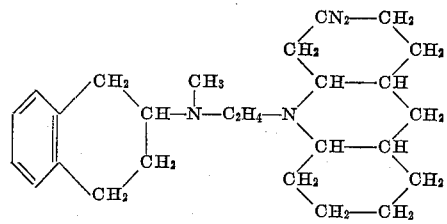

10.2 parts of N-methyl-ac-tetrahydro-beta-naphthylamine and 8.5 parts of chlorethylperhydroacridine are heated for 3 hours on the steam bath. The mass is further treated as indicated in Example 16, by dissolving, after the base has been distilled at 200° C at 3 mm. pressure, the residue remaining in the flask in acetone; by causing the new base to react with alcoholic hydrochloric acid, it yields the dihydrochloride which, after recrystallization, melts at 236° C.

This application is a division of our application Serial No. 602,400, filed March 31, 1932.

We claim:

1. The compound of the following formula:

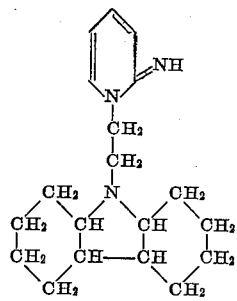

said compound forming a dihydrochloride melting at 274° C.

2. The compound of the following formula:

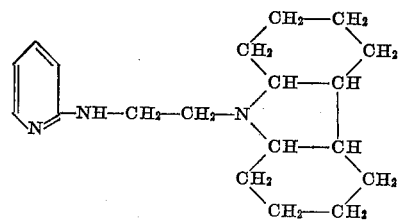

said compound boiling at 200° C. to 205° C. at 2 mm. pressure and forming a dihydrobromide melting at 209° C.

3. The compounds of the following formula:

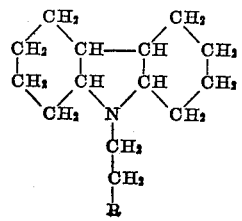

wherein $R_1$ stands for a pyridine or quinoline radical substituted by an imino group which radical may contain an alkyl or alkoxy group, said compounds being difficultly soluble or insoluble in water, forming hydrohalides soluble in water and being useful as therapeutics.

4. The compounds of the following formula:

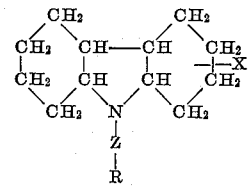

wherein Z stands for an alkyl or an alkoxy group which may be substituted by dialkylaminoalkyl, R stands for a radical of the pyridine and quinoline group which contains an amino- or imino group and may be substituted by alkyl or alkoxy and X may stand for alkyl or alkoxy substituting one of the hydrogen atoms of the —CH$_2$- groups, said compounds being difficultly soluble or insoluble in water, forming hydrohalides soluble in water and being useful as therapeutics.

5. The compounds of the following formula:

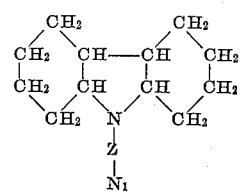

wherein Z stands for an alkyl group containing at least two carbon atoms which may be substituted by dialkylaminoalkyl, $N_1$ being nitrogen substituted by a pyridine or a quinoline group or being part of a pyridine or a quinoline radical substituted by an imino group which radical may contain alkyl or alkoxy, said compounds being difficultly soluble or insoluble in water, forming hydrohalides soluble in water, and being useful as therapeutics.

6. The compounds of the following formula:

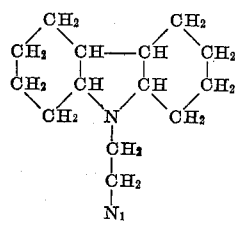

wherein $N_1$ stands for nitrogen substituted by a pyridine or a quinoline group or being part of a pyridine or a quinoline radical substituted by an imino group which radical may contain alkyl or alkoxy, said compounds being difficultly soluble or insoluble in water, forming hydrohalides soluble in water and being useful as therapeutics.

MAX BOCKMÜHL.
WALTER KROHS.
GUSTAV EHRHART.